United States Patent [19]

Tomalia et al.

[11] 4,435,548

[45] Mar. 6, 1984

[54] BRANCHED POLYAMIDOAMINES

[75] Inventors: Donald A. Tomalia; Larry R. Wilson; Jerry R. Conklin, all of Midland, Mich.

[73] Assignee: The Dow Chemical Company, Midland, Mich.

[21] Appl. No.: 258,158

[22] Filed: Apr. 27, 1981

[51] Int. Cl.$^3$ .............................................. C08G 69/26
[52] U.S. Cl. .................................... 525/451; 528/332; 528/363
[58] Field of Search ................ 528/332, 363; 525/451

[56] References Cited

U.S. PATENT DOCUMENTS

| | | | |
|---|---|---|---|
| 3,445,441 | 5/1969 | Rushton | 528/367 |
| 3,514,250 | 5/1970 | Rushton | 528/363 |
| 3,528,928 | 9/1970 | Rushton | 528/332 |
| 4,315,087 | 2/1982 | Redmore et al. | 528/363 |

*Primary Examiner*—John C. Bleutge
*Assistant Examiner*—Robert E. L. Sellers

[57] ABSTRACT

Branched polyamidoamines bearing a plurality of pendant aminoamide moieties exhibit properties which are superior to the linear polyamidoamines from which the branched polymers are derived. The branched polyamidoamine is readily prepared by reacting a linear polyamidoamine with an alkyl acrylate or methacrylate to prepare a polymer with pendant ester moieties. The ester moieties are then reacted with an alkylene diamine or a polyalkylene polyamine to produce the pendant aminoamide groups.

7 Claims, No Drawings

BRANCHED POLYAMIDOAMINES

BACKGROUND OF THE INVENTION

Novel branched polyamidoamines and a process for preparing them are described. In particular, novel polymers bearing a plurality of pendant amidoamine moieties are disclosed.

U.S. Pat. No. 3,445,441 describes the preparation of a variety of polyamidoamines by the reaction of an alkyl acrylate with a polyamine. Linear polyamidoamines are stated to be prepared by reacting stoichiometric amounts of the reactants. Cross-linked polyamidoamines are alleged to be produced when an excess of either reactant is utilized. However, we have found that when an excess of either reactant is present little cross-linking or branching occurs. Instead, the products are of significantly lower molecular weight than those produced with stoichiometric amounts of reactants and the products are capped with the moiety present in excess. These polyamidoamines are disclosed in this patent to possess activity as demulsifiers.

U.S. Pat. No. 3,305,493 discloses the preparation of water-soluble, linear polyamidoamines by the reaction of an alkyl acrylate with a polyamine. This condensation product is recited to react with a wide variety of compounds.

U.S. Pat. No. 3,200,106 discloses a variety of derivatives of high molecular weight polyalkylene polyamines. One of these products is the condensation product of the polyamine with an alkyl acrylate. This condensation product bears pendant ester groups.

SUMMARY OF THE INVENTION

This invention is in part a novel branched polyamidoamine having a weight average molecular weight of at least about 550, preferably at least about 1100, as determined by low-angle laser light scattering. This polyamidoamine consists essentially of units corresponding to the formula I

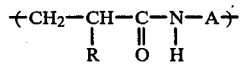

wherein R at each occurrence is hydrogen or methyl; A is

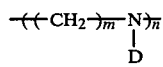

wherein m is an integer from 2 to about 10 and n is an integer from 1 to about 6; D at each occurrence is independently —H or corresponds to the formula II

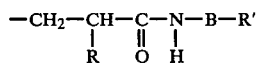

wherein B is $-(\!-CH_2)_x-\!-NR'-\!\!+_y$ or

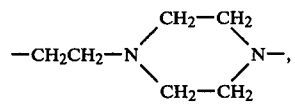

x is an integer from 2 to about 10, y is an integer from 1 to about 6, and R' at each occurrence is independently —H, a $C_1$ to $C_4$ alkyl or a $C_1$ to $C_4$ hydroxyalkyl. At least about 10 percent, preferably at least about 30 percent, of the groups represented by D correspond to formula II.

DETAILED DESCRIPTION OF THE INVENTION

The novel branched polyamidoamine is prepared using essentially linear polyamidoamines as starting materials. The linear polyamidoamines are conveniently prepared in the manner described in U.S. Pat. No. 3,305,493, the relevant portions of which are incorporated by reference herein. In general, an alkylene diamine (where n=1) or a polyalkylene polyamine (where n>1) is contacted at reactive conditions with an alkyl acrylate or methacrylate or less desirably acrylamide, acrylic acid or methacrylic acid to prepare an essentially linear polyamidoamine. Preferably, the reactants are employed in close to their stoichiometric ratio. This linear polyamidoamine consists of units of the formula

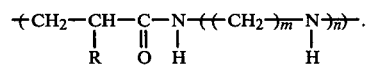

Preferably, m is 2 or 3, most preferably 2. Preferably, n is 1, 2, 3 or 4, most preferably 1 or 2. The linear polyamidoamine should have a weight average molecular weight of at least about 500, preferably at least 1000.

The linear polyamidoamine is reacted in a Michael addition reaction with a compound selected from the group consisting of acrylic acid, methacrylic acid, acrylamide, or esters or acrylic or methacrylic acid derived from a primary alcohol having from 1 to 10 carbon atoms. Methyl or ethyl acrylate is the preferred reactant for addition to the linear polyamidoamine.

The addition of the α,β-ethylenically unsaturated carboxylic acid, acid ester or corresponding amide to the preformed polymer should be performed at a temperature which avoids substantial cross-linking of the polymer. Generally, a temperature in the range from about 0° C. to about 200° C. is operable, with temperatures from about 20° C. to about 100° C. being preferred. This reaction can be conducted neat. However, the presence of a diluent which dissolves the polyamidoamine but is substantially inert to the reactants is desirable as it facilitates more complete mixing and more efficient heat transfer of the reaction medium during the exothermic Michael addition reaction. Water and $C_1$ to $C_4$ alkanols are preferred diluents. Methanol is the most preferred diluent.

The ratio of the equivalent of the aforementioned unsaturated reactant to the equivalents of labile hydrogens borne by the nitrogen atoms in the linear polyamidoamine can be varied to produce the desired substitution of pendant esters groups on the polyamidoamine. If complete substitution is desired, a stoichiometric amount or an excess of the alkyl acrylate or other unsaturated reaction can be employed. If a lesser degree of substitution is desired, the reactants can be combined in the appropriate ratios and essentially completely reacted. The progress of this reaction can be monitored by infrared spectrophotometric analysis or other techniques known in the art. It is desirable that at least about 10 percent of the labile hydrogens be reacted with alkyl acrylate or the other unsaturated reactants to endow the ultimate branched polymer with the unique properties and advantages described herein.

The polyamidoamine bearing pendant groups corresponding to the formula I

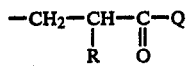

wherein R is —H or —CH$_3$ and Q is —OH, —NH$_2$ or a C$_1$—C$_{10}$ alkoxy is reacted with an alkylene diamine or polyalkylene polyamine, which optionally bears hydroxyalkyl moieties, to prepare the instant branched polyamidoamines. Prior to introduction of the alkylene diamine or polyalkylene polyamine, essentially all of the unreacted alkyl acrylate or methacrylate or corresponding acid or amide is desirably removed by distillation. A sufficient amount of the alkylene diamine or polyalkylene polyamine is advantageously employed to suppress cross-linking of the polyamidoamine which can occur through the pendant moieties corresponding to formula I. Typically, a 200 to 300 mole percent excess of the alkylene diamine or polyalkylene polyamine relative to the moieties of formula I on the polyamidoamine is sufficient to avoid gelation of the polyamidoamine due to cross-linking.

Alkylene diamines which may be reacted with the substituted polyamidoamine include ethylenediamine, propylenediamine and hexamethylenediamine. Illustrative operable polyalkylene polyamines are diethylenetriamine and tetraethylenepentamine. Ethylenediamine and diethylenetriamine are preferred as reactants if terminal primary amines are desired. Aminoethylethanolamine and N,N-dimethyl ethylenediamine are other preferred reactants.

The conditions necessary to promote reaction of the substituted polyamidoamine with the alkylene diamine or polyalkylene polyamine will vary dependent on the identity of Q in the pendant groups corresponding to formula I. If Q is a C$_1$ to C$_{10}$ alkoxy, the reaction involves a simple amidation of the pendant ester groups on the polyamidoamine which proceeds under relatively mild conditions. This amidation of the ester occurs readily at temperatures in the range from about 20° C. to about 200° C. The amidation of the ester can be performed neat, but an inert diluent in which the reactants are soluble is preferably present. Water is a preferred diluent, but hydrolysis of the ester groups present can occur at higher reaction temperatures unless an excess of the alkylene diamine or polyalkylene polyamine reactant is present. Methanol or other lower alkanols are also preferred as diluents.

If Q is formula I is —OH or —NH$_2$, more severe reaction conditions must be utilized than when Q is an alkoxy group. Reaction temperatures in the range from about 125° C. to about 200° C. are generally operable, with temperatures of from about 150° C. to about 190° C. being preferred. Generally, a diluent is not necessary at these reaction conditions because the substituted polyamidoamine is readily agitated at these reaction temperatures.

The branched polyamidoamine is conveniently recovered by distillation of solvents and by-products from the polymer at reduced pressure. The time required to effect substantially complete reaction will vary dependent on the reaction temperature and other factors.

The novel branched polyamidoamines described herein possess several unique and surprising properties not shared by the prior art. The branched polyamidoamines which bear a plurality of terminal primary amines possess exceptional utility as curing agents for epoxides. Those branched polyamidoamines bearing a plurality of terminal tertiary amine groups exhibit unexpected activity relative to linear polyamidoamines in the demulsification of oil in water emulsions. The branched polyamidoamines also exhibit enhanced performance as flocculants and dye retention additives. Branched polyamidoamines reacted with epichlorohydrin have been found to impart superior wet strength properties to paper.

The following examples are presented to illustrate the invention. All parts and percentages are by weight unless otherwise indicated.

EXAMPLE 1

To a 250 milliliter (ml) flask equipped with a condenser, stirrer and means for measuring temperature was charged 60.1 grams (1 mole) of ethylene diamine. Over a period of 35 minutes, 86.09 grams (1 mole) of methyl acrylate was added dropwise with stirring to the flask at an initial temperature of 20° C. The temperature of the reaction mixture peaked at 70° C. during this addition. At the end of this addition, analysis of the reaction mixture by proton magnetic resonance detected no protons on unsaturated carbons in the reaction mixture. The reaction mixture was sparged with nitrogen and heated at 90° C. to 95° C. for 24 hours. The resulting product was a very viscous, light yellow liquid. The methanol was removed by distillation at reduced pressure. Analysis by proton magnetic resonance confirmed that this product was an essentially linear polyamidoamine. This polymer was determined by light scattering to have a molecular weight of 6–8,000.

The linear polyamidoamine was diluted with water to 65 percent solids. To a 250 ml flask equipped with a stirrer, condenser, and means for indicating temperature was charged 50 grams of the aqueous solution of the linear polyamidoamine. To this flask was introduced at 20° C., 24.54 grams of methyl acrylate in a single charge, which provides 1 equivalent of methyl acrylate for each equivalent of amino hydrogens present. The temperature of the reaction mixture rose to 30° C. due to the exothermic reaction. The reaction mixture was heated with stirring at 80° C. for 4 hours. Analysis by carbon-13 nuclear magnetic resonance indicated that 95 percent of the unsaturated moieties present in the methyl acrylate introduced had reacted. To this reaction mixture was charged 70 grams of ethylene diamine, which provides 4 equivalents of ethylene diamine for each equivalent of ester present. The reaction mixture was heated for 4 more hours at 80° C. Analysis of the resulting product by proton magnetic resonance indicated that substantially complete conversion of ester moieties to amide moieties had occurred and a plurality of pendant primary amine groups were present on the polymer. Excess methanol, water and ethylene diamine were removed from the resulting branched polyamidoamine by distillation at 60° C. to 95° C. under reduced pressure.

EXAMPLE 2

To a 250 ml flask was charged 109.2 grams of the linear polyamidoamine prepared in the first reaction in Example 1 and 50 ml of CH$_3$OH. The flask was equipped with a stirrer, a condenser and a means for measuring temperature. To the polyamidoamine was added 27.49 grams of methyl acrylate dropwise with stirring at an initial temperature of 20° C. This addition introduces 1 equivalent of methyl acrylate for every 3 equivalent of amino hydrogens in the polyamidoamine. The temperature of the reaction mixture rose to 40° C. during addition of the methyl acrylate. Immediately following the addition of the acrylate, 61.5 grams of ethylene diamine was introduced. The reaction mixture was then heated at 80° C. for 18 hours at 90° C. The methanol and excess enthylene diamine were removed by distillation at reduced pressure. The resulting polymer was light tan in color and a tacky solid which was soluble in water or methanol.

EXAMPLE 3

To a 500 ml flask was charged 165.9 grams of the linear polyamidoamine prepared in the first reaction in Example 1 and 100 grams of CH$_3$OH. The flask was equipped with a stirrer, a condenser and a means for measuring temperature. To the polyamidoamine was added dropwise 41.5 grams of methyl acrylate at a temperature of 70° C. Immediately following the addition of the acrylate, 43.4 grams of N,N-dimethyl ethylene diamine was added to the reaction mixture. The reaction mixture was heated at 115° C. for 72 hours. The reaction mixture was then distilled to remove methanol. The resulting tacky, orange polymer was analyzed by proton magnetic resonance and infrared spectrophotometry and was determined to be a branched polyamidoamine bearing a plurality of pendant tertiary amine groups.

Examples 4 and 5 indicate that a branched polyamidoamine is a more powerful demulsifier than its linear counterpart.

EXAMPLE 4

A biphasic liquid containing 95 percent tap water and 5 percent crude oil was combined with 50 parts per million (ppm) of a sodium salt of petroleum sulfonate. This liquid blended at high speed for 5 minutes to prepare a stable emulsion. A linear polyamidoamine prepared from ethylene diamine and methyl acrylate and having a molecular weight of 1500 was charged to samples of the emulsion at loading of 25, 50, 100 and 250 ppm. After 12 hours, no demulsification was observed.

A branched polyamidoamine having a molecular weight of about 2000 was tested as a demulsifier. This polymer was prepared by converting 30 percent of the amino hydrogens on the above-described linear polyamidoamine to groups of the formula

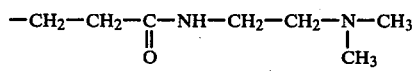

by sequential reaction of the linear polyamidoamine with methyl acrylate and then N,N-dimethyl ethylene diamine.

The branched polyamidoamine was introduced to samples of the aforementioned oil emulsion at loadings of 25, 50, 100 and 250 ppm. At the 100 ppm loading the emulsion yielded a clear aqueous phase after 12 hours. The branched polyamidoamine exhibited no demulsification activity at the other loadings tested.

EXAMPLE 5

In a manner otherwise similar to Example 4, an oil-in-water emulsion was prepared using 250 ppm sodium oleate in place of the sodium salt of the petroleum sulfonate. The linear polyamidoamine described in Example 4 was charged to samples of the emulsion at loadings of 25, 50 and 74 ppm. Demulsification was observed after 1 hour only at the 74 ppm loading.

The branched polyamidoamine described in Example 4 was charged to samples of the emulsion at loadings of 25, 50 and 74 ppm. Demulsification was observed after 1 hour at the 25 ppm loading.

What is claimed is:

1. A branched polyamidoamine having a weight average molecular weight of at least about 550 and consisting essentially of units corresponding to the formula I

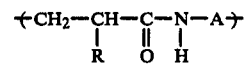

wherein R at each occurrence is independently —H or CH$_3$; A is

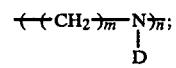

m is an integer from 2 to about 10 and n is an integer from 1 to about 6; D at each occurrence is independently —H or corresponds to formula II

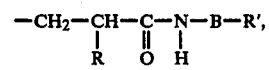

with the proviso that at least about 10 percent of the groups represented by D correspond to formula II; B is $-(-CH_2)_x-NR'-)_y$ or

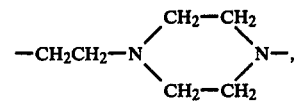

x is an integer from 2 to about 10 and y is an integer from 1 to about 6; R' at each occurrence is independently —H, a C$_1$ to C$_4$ alkyl, or a C$_1$ to C$_4$ hydroxyalkyl.

2. The polyamidoamine as described in claim 1 wherein B is $-(-CH_2)_x-NR'-)_y$ and x and m are each independently 2 or 3.

3. The polyamidomine as described in claim 2 wherein y and n are each independently 1 or 2.

4. The polyamidoamine as described in claim 3 wherein R' at each occurrence is independently —H, —CH$_3$ or —CH$_2$OH.

5. The polyamidoamine as described in claim 4 wherein x and m are each 2, y and n are each 1, R' is —CH$_3$ at each occurrence and R is H at each occurrence.

6. The polyamidoamine as described in claim 4 wherein x and m are each 2, y and n are each 1 and R' and R are H at each occurrence.

7. The branched polyamidoamine of claim 1 which consists essentially of units corresponding to the formula:

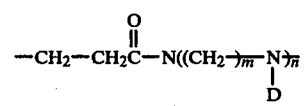

wherein m is 2 or 3, n is 1 or 2 and D at each occurrence is independently —H or
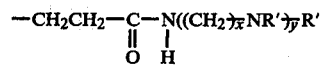
wherein x is 2 or 3 and R' at each occurrence is —H, —CH₃ or —CH₂OH.
* * * * *